(12) United States Patent
Kato

(10) Patent No.: US 8,649,161 B2
(45) Date of Patent: Feb. 11, 2014

(54) ON-VEHICLE DISPLAY APPARATUS

(75) Inventor: Kazunari Kato, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 67 days.

(21) Appl. No.: 13/431,344

(22) Filed: Mar. 27, 2012

(65) Prior Publication Data

US 2012/0262868 A1 Oct. 18, 2012

(30) Foreign Application Priority Data

Apr. 15, 2011 (JP) .................................. 2011-091354

(51) Int. Cl.
*H05K 5/00* (2006.01)
*H05K 7/00* (2006.01)

(52) U.S. Cl.
USPC .............. 361/679.01; 312/319.6; 248/292.12; 248/917; 345/905; 224/483; 361/679.21; 361/679.06; 348/837

(58) Field of Classification Search
USPC .............. 361/679.05, 679.06, 679.07, 679.01
See application file for complete search history.

(56) References Cited

U.S. PATENT DOCUMENTS

| | | | |
|---|---|---|---|
| 7,113,179 B2 * | 9/2006 | Baker et al. ................... | 345/178 |
| 7,491,127 B2 * | 2/2009 | Bristol et al. ................... | 464/16 |
| 7,772,960 B2 * | 8/2010 | Baker ............................ | 338/99 |
| 7,950,610 B2 * | 5/2011 | Sawai .......................... | 248/131 |
| 8,174,629 B2 * | 5/2012 | Park ............................ | 348/837 |
| 2006/0108900 A1 * | 5/2006 | Lee ............................ | 312/319.6 |
| 2010/0226086 A1 | 9/2010 | Kissel | |

\* cited by examiner

*Primary Examiner* — Hoa C Nguyen
*Assistant Examiner* — Keith Depew
(74) *Attorney, Agent, or Firm* — Brinks Gilson & Lione

(57) ABSTRACT

An on-vehicle display apparatus includes a motor, a gear train, a threaded rod, a slider screwed to the threaded rod, and a display main body rotatably connected to the slider. The lead angle of the threaded rod is set greater than the friction angle thereof. The gear train includes first and second gears facing each other. Protrusions provided on one of the first and second gears are fitted in recesses provided in the other. A spring member elastically urges the first gear toward the second gear. A detection sensor detects the size of an external force on the basis of the displacement of the first gear against the spring member in the axial direction. The motor is controlled on the basis of the detection result of the detection sensor such that the display main body is moved away from the external force.

11 Claims, 23 Drawing Sheets

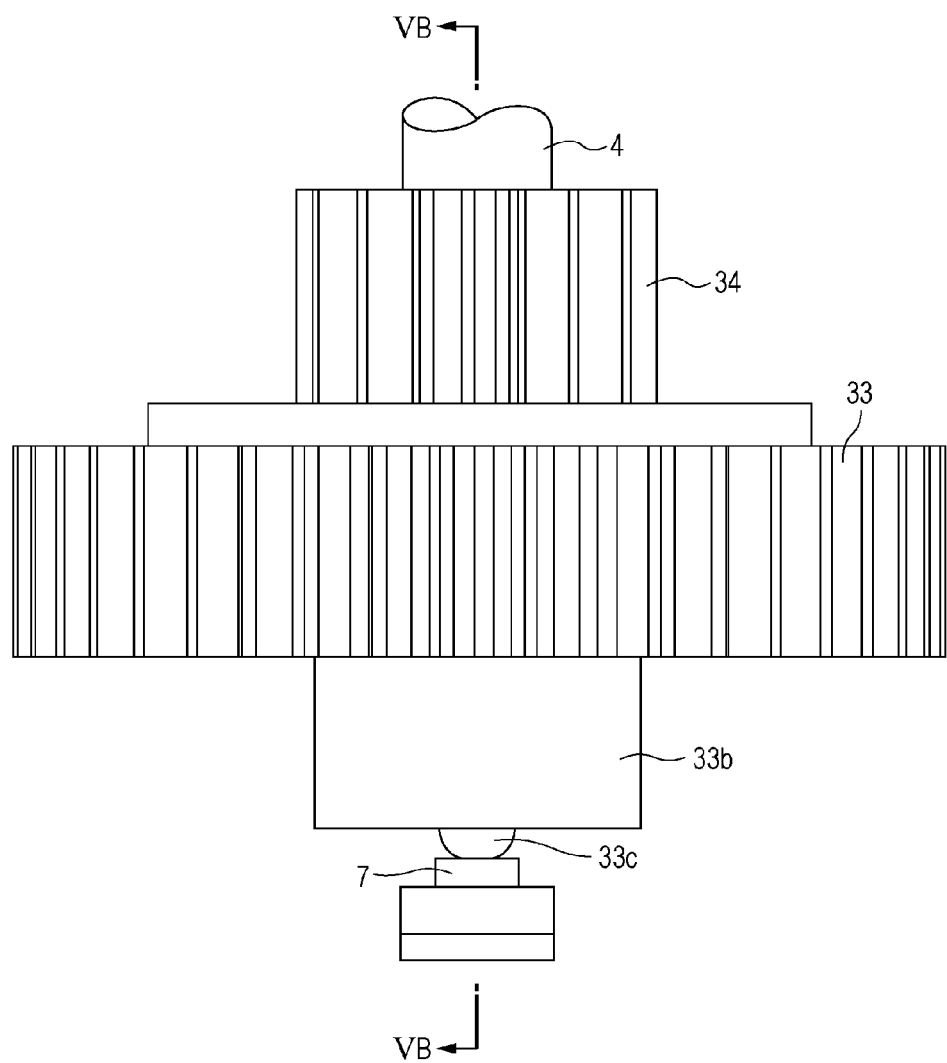

ON-VEHICLE DISPLAY APPARATUS

RELATED APPLICATION

The present application claims priority to Japanese Application Number 2011-091354, filed Apr. 15, 2011, the entirety of which is hereby incorporated by reference.

BACKGROUND OF THE INVENTION

1. Field of the Invention

The present invention relates to an on-vehicle display apparatus installed in an automobile for displaying TV programs, map information of a navigation system, and the like, and more specifically, to an on-vehicle display apparatus having a display main body that can be retracted when not in use.

2. Description of the Related Art

When this type of on-vehicle display apparatus is in use, the display main body can be raised to a position where the display main body can be easily viewed by the user. When the apparatus is not in use, the display main body can be retracted, for example, in the dashboard. Thus, the display main body not in use does not take up space in the car.

In recent years, on-vehicle display apparatuses in which a display main body is moved between a retracted state and a raised state by the drive force of a motor have become common. When the display main body is in a predetermined retracted position, the display main body is moved forward and raised by transmitting the rotational drive force of the motor through a power transmission mechanism including gears and levers to the display main body. When retracting the display main body in the raised state, the display main body is inclined and moved backward to the retracted position by transmitting the rotational drive force of the motor in the reverse direction through the power transmission mechanism to the display main body.

In conventional on-vehicle display apparatuses using the drive force of a motor, usually, a power transmission mechanism is configured by combining many gears with levers or racks, and brace-like rotating arms (supporting arms) are attached to both left and right sides of a display main body. For this reason, this type of on-vehicle display apparatus has a problem given that the configuration of the power transmission mechanism is complex, the number of components is large, and it is difficult to reduce the size and thickness of the apparatus.

In a conventional on-vehicle display apparatus described in U.S. Patent Application Publication No. 2010/0226086, a second lever is rotatably connected to the distal end of a first lever rotationally driven by the drive force of a motor, a guide portion extending from the lower end of the back of a display main body is rotatably connected to the distal end of the second lever, and thus the display main body rises obliquely upward as the first lever is rotated forward. Thus, such a conventional on-vehicle display apparatus need not use many gears in a power transmission mechanism that moves the display main body, and is relatively simple in configuration.

However, in the conventional on-vehicle display apparatus described in U.S. Patent Application Publication No. 2010/0226086, the display main body is pulled obliquely downward and is thereby retracted, and a space for the rotation of the first and second levers and guide portion that rotate in a vertical plane needs to be secured. Thus, the thickness of the whole apparatus cannot be reduced significantly.

In this type of on-vehicle display apparatus, when the display main body has been raised or when the display main body is being raised, sometimes an external force that tries to forcibly retract the display main body or an external force that interferes with the raising of the display main body is applied owing to collision with the user's body, mischief of a child, or the like. In that case, there is a possibility that gears that constitute the power transmission mechanism of the on-vehicle display apparatus are subjected to an excessive force and damaged. There is known an on-vehicle display apparatus in which, in order to avoid such a possibility, a clutch mechanism is interposed in the power transmission pathway. However, adding a clutch mechanism makes the structure larger, and thus makes it difficult to reduce the whole apparatus in thickness. When the transmission pathway of an unwanted external force applied to the display main body is blocked by a clutch mechanism, there is a possibility that the clutch plate or the like slides and generates a rasping abnormal noise.

SUMMARY OF THE INVENTION

It is an object of the present invention to provide an on-vehicle display apparatus that can be easily reduced in thickness and can prevent damage when an unwanted external force is applied to a display main body.

In one aspect of the present invention, an on-vehicle display apparatus includes a motor, a threaded rod provided with a helically extending thread groove, a gear train transmitting the drive force of the motor to the threaded rod, a slider screwed to the thread groove and moving back and forth with the rotation of the threaded rod, a case in which the motor, the threaded rod, the gear train, and the slider are disposed, and a display main body rotatably connected to the slider and capable of being moved by the drive force of the motor between a state where the display main body is retracted in the case and a state where the display main body is raised in the front part of the case. The lead angle of the threaded rod is set greater than the friction angle thereof so that the threaded rod is rotated by an external force applied to the slider through the display main body. The gear train includes a first gear on the relatively input side and a second gear on the relatively output side. The first and second gears face each other. Protrusions provided on one of the first and second gears are fitted in recesses provided in the other so that the gears rotate coaxially and integrally. The on-vehicle display apparatus further includes a spring member elastically urging the first gear toward the second gear, and a detection sensor detecting the size of the external force on the basis of the displacement of the first gear against the spring member in the axial direction. The motor is controlled on the basis of the detection result of the detection sensor such that the display main body is moved away from the external force.

As described above, the facing surfaces of the first gear on the input side and the second gear on the output side are in a recess-protrusion engagement, the first gear is elastically urged toward the second gear by the spring member, and so the first and second gears can be rotated coaxially and integrally. Thus, the drive force of the motor can be reliably transmitted from the first gear through the second gear to the threaded rod. Since the display main body is rotatably connected to the slider that moves back and forth with the rotation of the threaded rod, the display main body can be moved smoothly, while being guided by cam grooves or the like, between a horizontal retracted position and a vertical raised position. Thus, the whole apparatus can be easily reduced in thickness.

If a pushing force tries to forcibly retract the display main body in the raised state and the slider rotates the threaded rod, the second gear rotates relative to the first gear that is not rotating, and thus the protrusions of the second gear gradually come out of the recesses of the first gear, and the first gear is displaced against the spring member away from the second gear. On the basis of the displacement of the first gear, the size of the pushing force is detected by the detection sensor. Thus, by appropriately controlling the motor according to the detection result, the operation required to move the display main body away from the pushing force can be performed quickly. Similarly, if a resisting force interferes with the raising of the display main body, this resisting force prevents the threaded rod and the second gear from rotating, and thus, as the first gear is rotated by the drive force of the motor, the protrusions gradually come out of the recesses, and the first gear is displaced against the spring member away from the second gear. Also in this case, on the basis of the displacement of the first gear, the size of the resisting force is detected by the detection sensor. Thus, by appropriately controlling the motor according to the detection result, the operation required to move the display main body away from the resisting force can be performed quickly. Thus, damage to the power transmission mechanism when an unwanted external force such as a pushing force or a resisting force is applied to the display main body can be prevented without the need to add a large clutch mechanism.

In the above-described configuration, the second gear may rotate coaxially and integrally with the threaded rod. Alternatively, the second gear may be in meshing engagement with a third gear that rotates coaxially and integrally with the threaded rod. In this case, the axis of the first and second gears can be offset with respect to the axis of the threaded rod. Thus, when the first gear is displaced against the spring member in the axial direction, there is no possibility that the reaction force displaces the threaded rod in the axial direction. Thus, the reliability is improved.

BRIEF DESCRIPTION OF THE DRAWINGS

FIGS. 5A and 5B are explanatory views of the main part of a gear train used in the first embodiment, FIG. 5A being a top view of the gear train, and FIG. 5B being a sectional view taken along line VB-VB of FIG. 5A;

DESCRIPTION OF THE PREFERRED EMBODIMENTS

Figure 1:
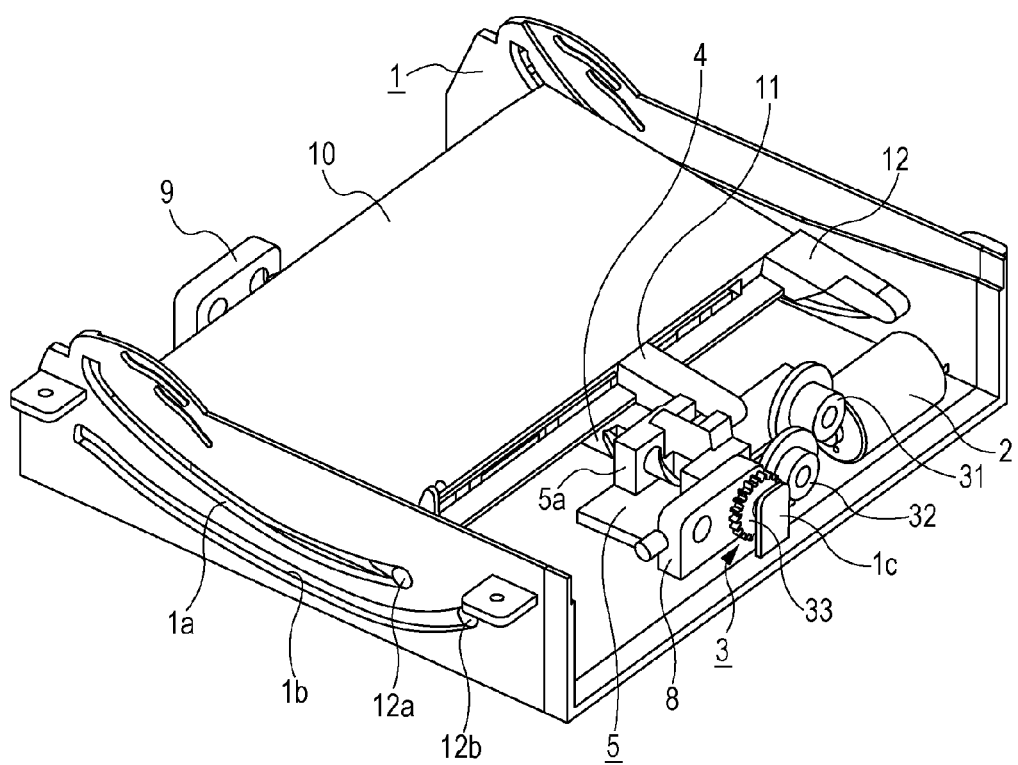
FIG. 1 is a perspective view showing an on-vehicle display apparatus according to a first embodiment of the present invention in a state where a display main body is retracted.

Embodiments of the present invention will now be described. First, an embodiment of the present invention will be described with reference to FIG. 1 to FIG. 13.

An on-vehicle display apparatus according to the first embodiment includes a display main body 10 that is an LCD or the like and that can be retracted in a horizontal position in a case 1 and can be raised in a vertical position in the front part of the case 1. The drive source that moves the display main body 10 between the retracted position and the raised position is a motor 2. The drive force of the motor 2 is transmitted to the display main body 10 through a gear train 3, a threaded rod 4, a slider 5, and other power transmission mechanisms. These power transmission mechanisms are disposed in the case 1 together with a circuit board (not shown) and other components. This circuit board is provided with a circuit that drives the display main body 10 and other components. This on-vehicle display apparatus is used with a cover member 20 shown in FIG. 4 and FIG. 13 attached thereto.

Figure 5B:
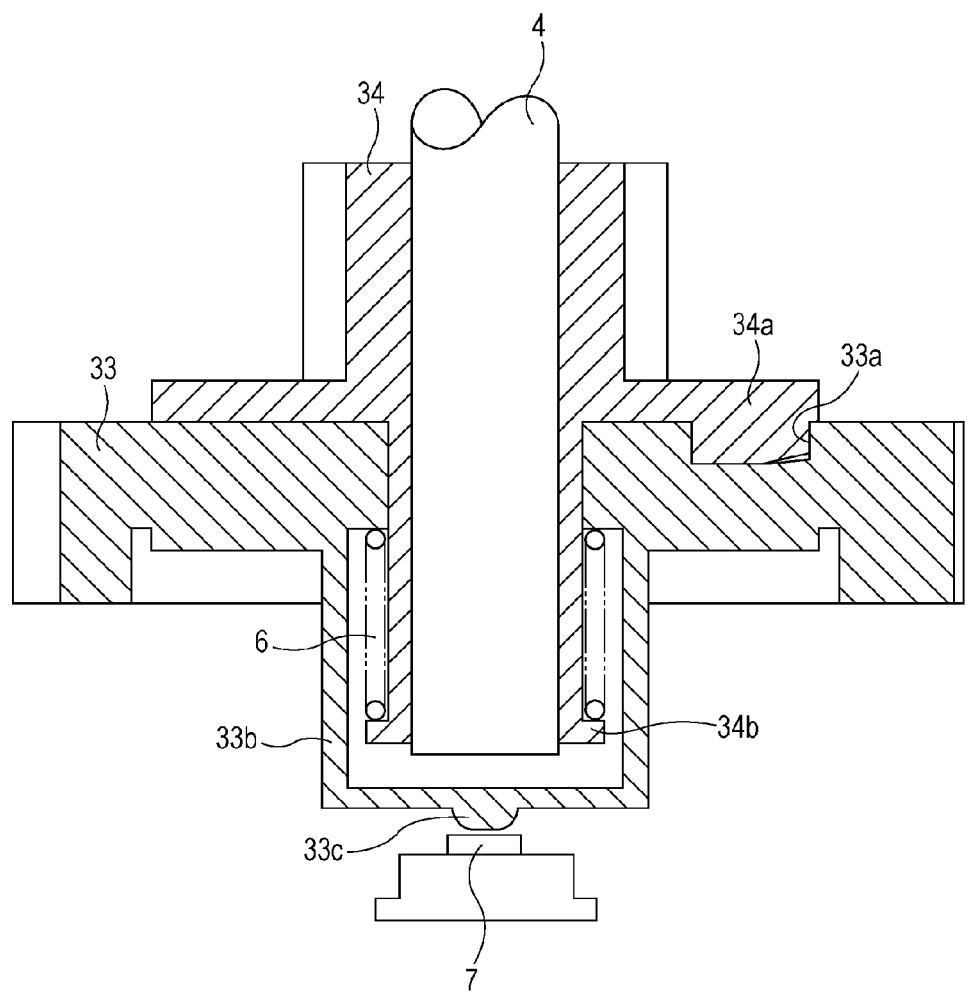
Figure 14:
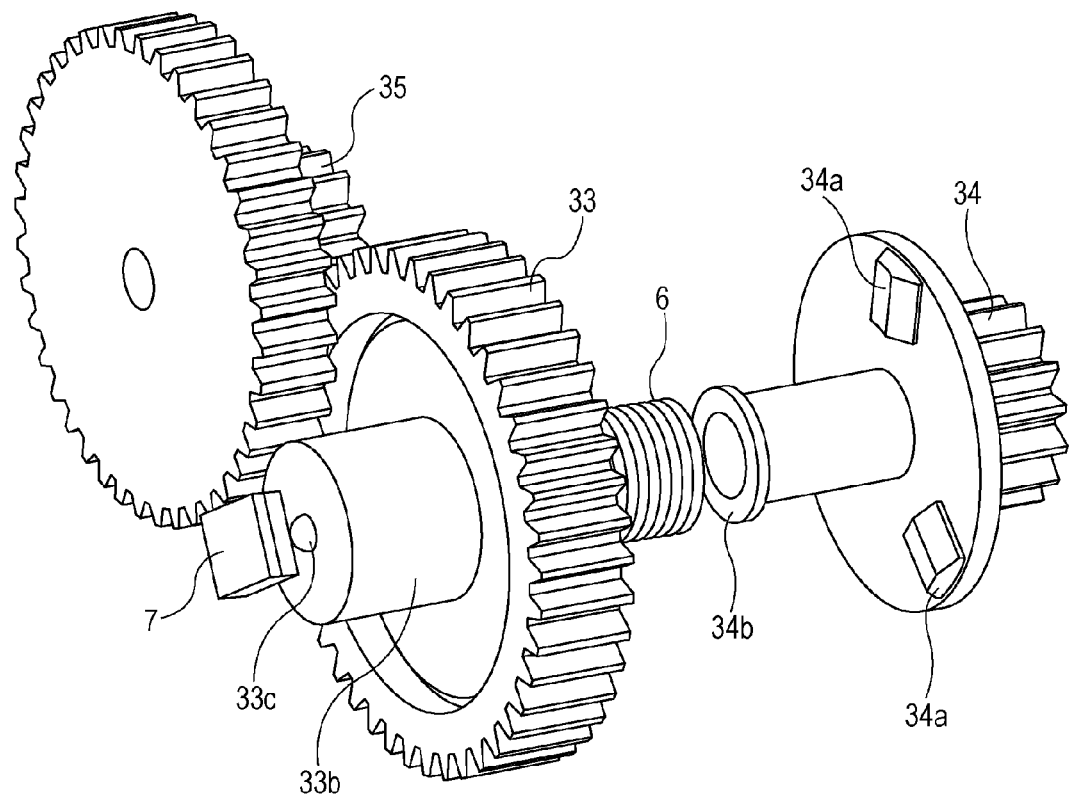
FIG. 14 is an exploded perspective view showing the main part of a gear train used in an on-vehicle display apparatus according to a second embodiment of the present invention.
Figure 15:
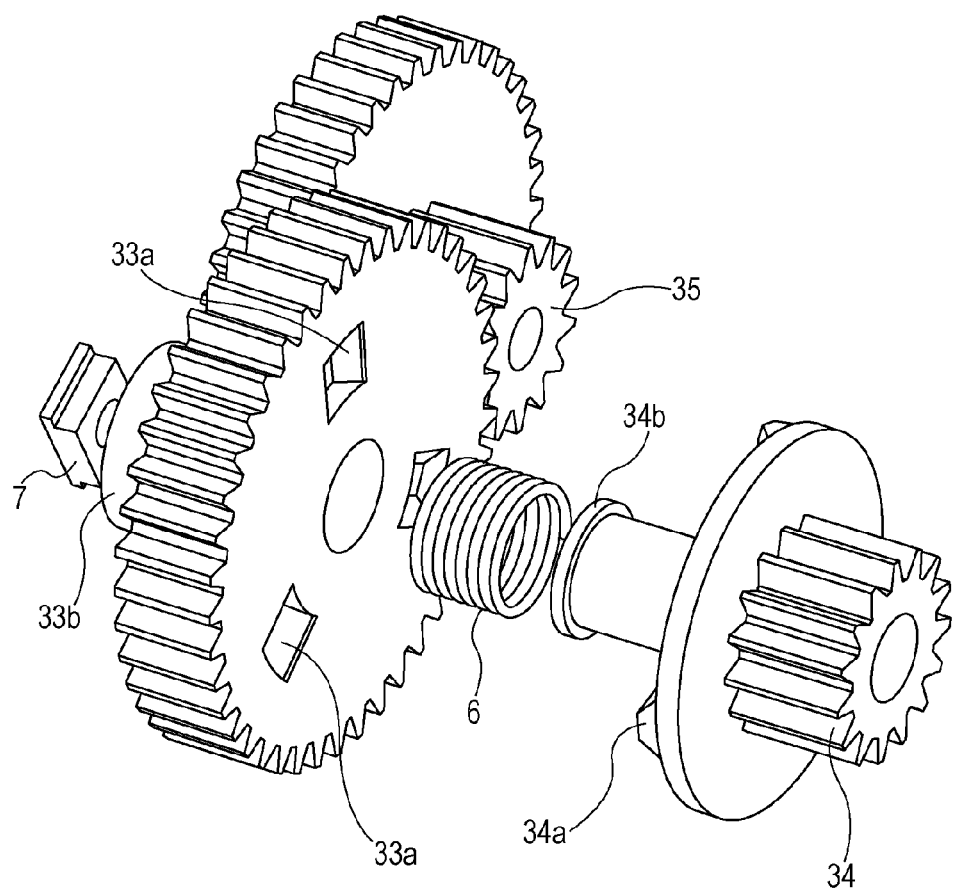
FIG. 15 is an exploded perspective view corresponding to FIG. 14 from another angle.
Figure 16A:
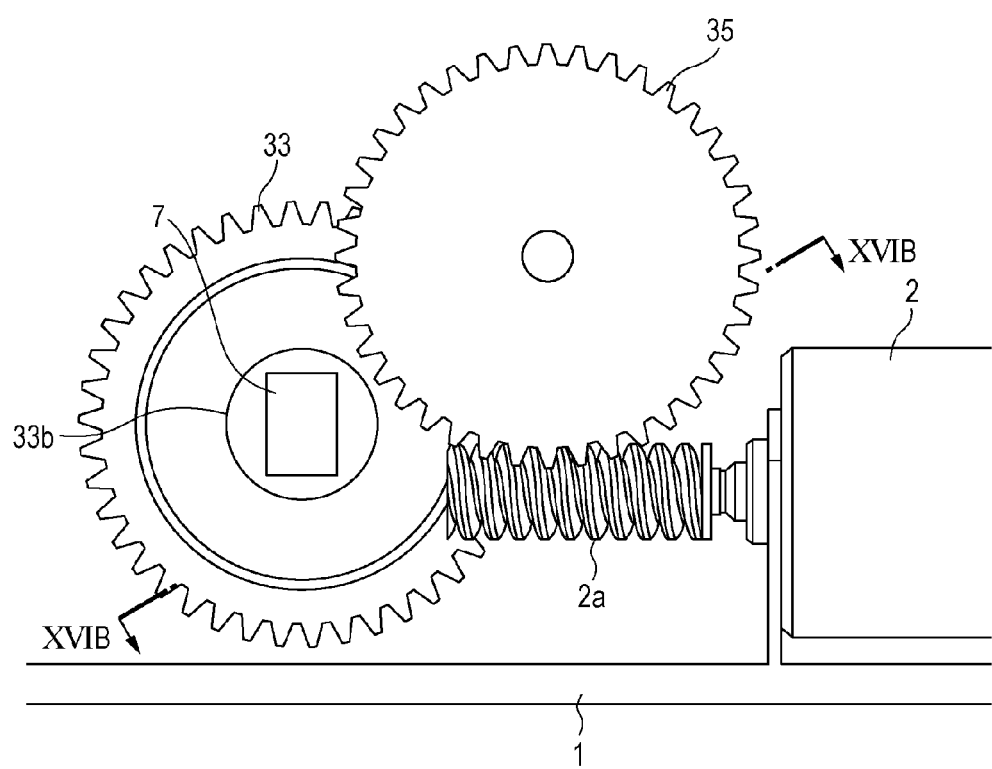
FIGS. 16A and 16B are explanatory views of the gears shown in FIGS. 14 and 15, FIG. 16A being a rear view of the gears, and FIG. 16B being a sectional view taken along line XVIB-XVIB of FIG. 16A.
Figure 16B:
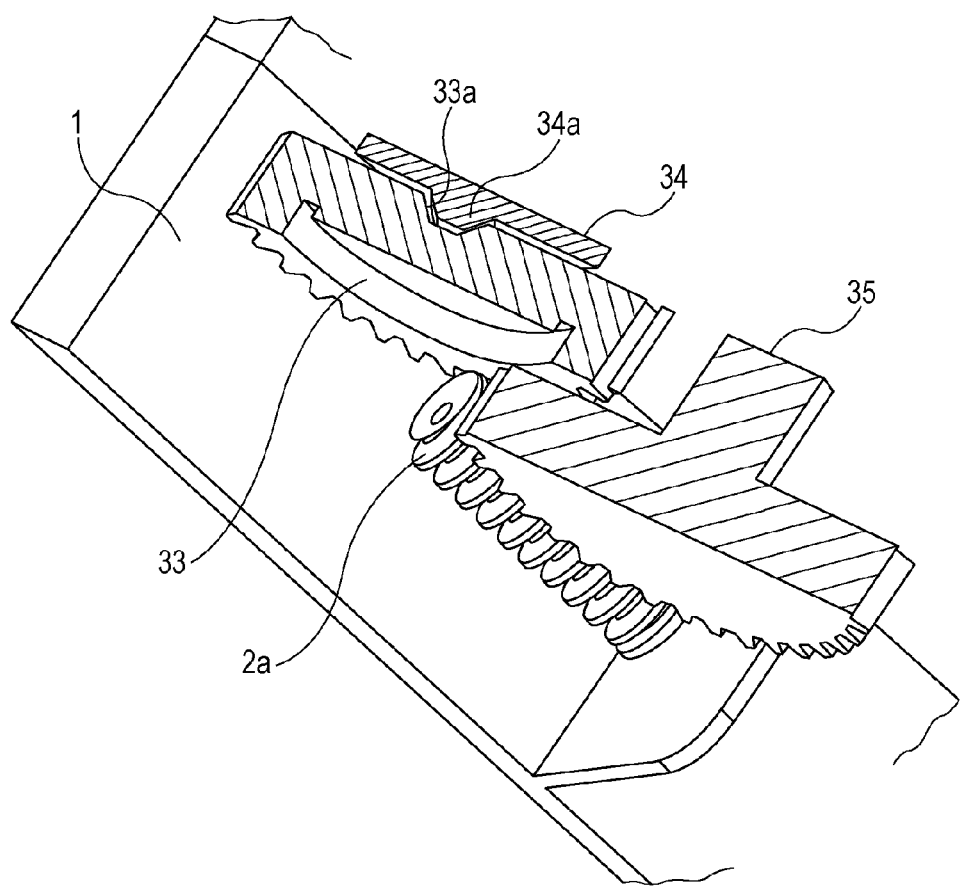
Figure 17A:
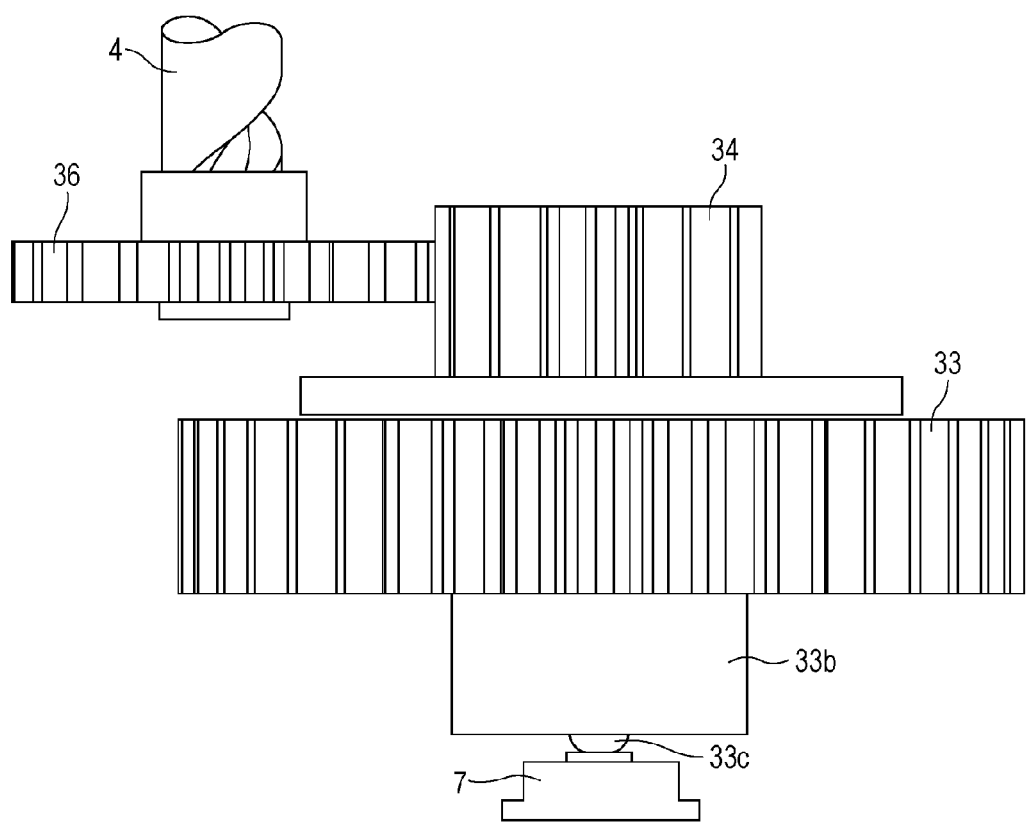
FIGS. 17A, 17B, and 17C illustrate the operation of the gears shown in FIGS. 14 and 15, FIG. 17A being a top view of the gears, FIG. 17B being a rear view of the gears, and FIG. 17C being a sectional view taken along line XVIIC-XVIIC of FIG. 17B.
Figure 17B:
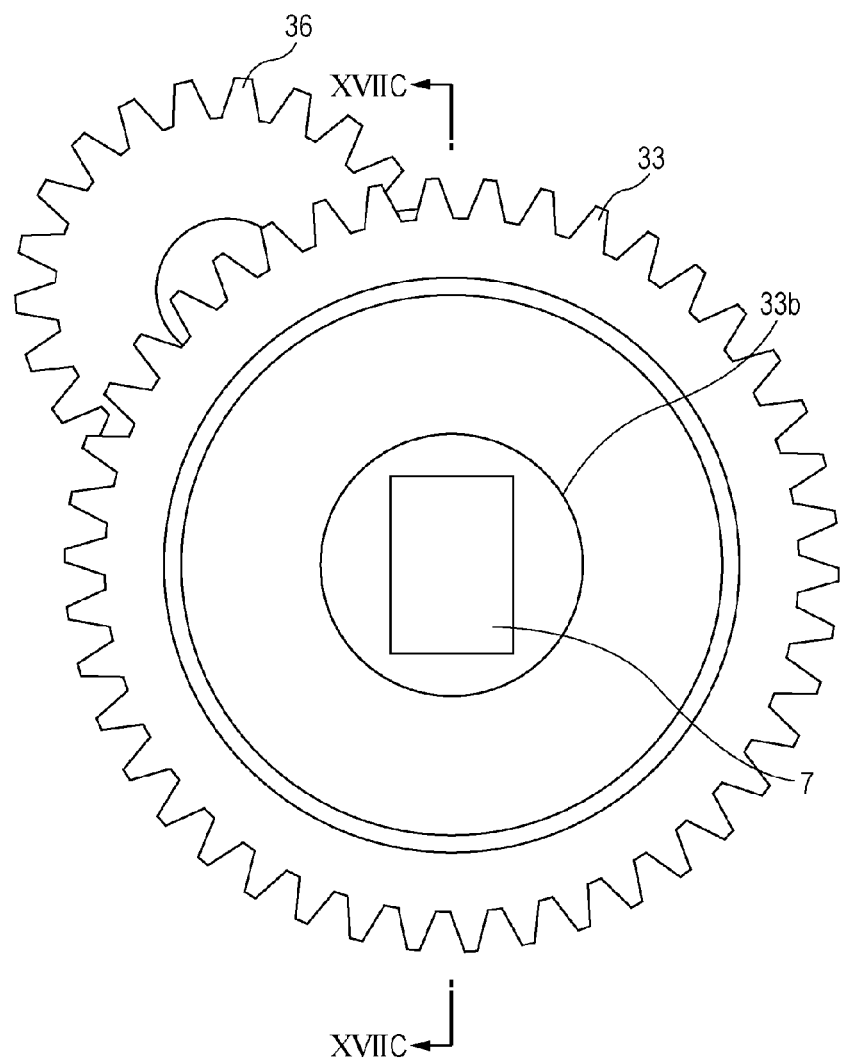
Figure 17C:
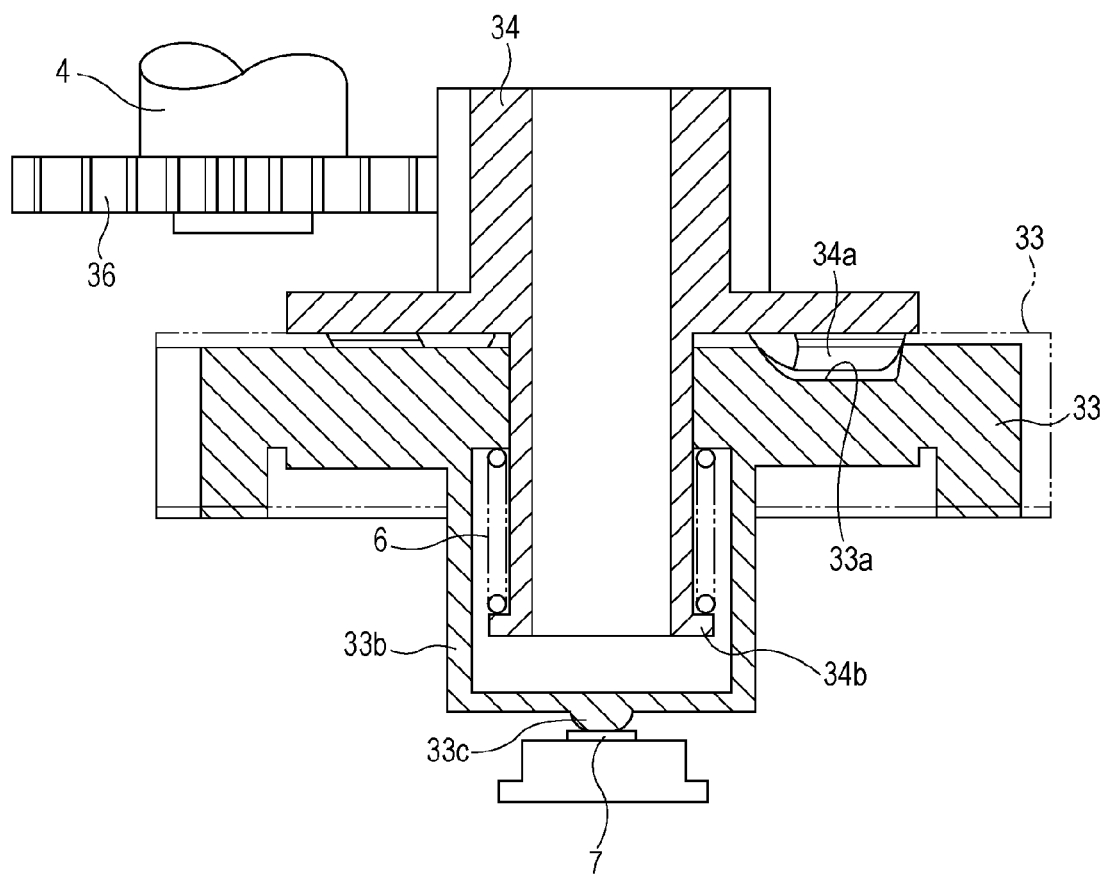

The motor 2 is disposed on the bottom plate portion of the case 1. The drive force of the motor 2 is transmitted from a worm 2a through gears 31 and 32 to a first gear 33. As shown in FIG. 5A-B, the first gear 33 is in a recess-protrusion engagement with a second gear 34 fixed to the rear end of the threaded rod 4, and the axis of the first and second gears 33 and 34 is coincident with the axis of the threaded rod 4. Specifically, the first gear 33 has a plurality of (for example, three) recesses 33a in its surface facing the second gear 34, the second gear 34 has a plurality of (for example, three) protrusions 34a on its surface facing the first gear 33, and the protrusions 34a are fitted in the recesses 33a. The recesses 33a and the protrusions 34a are formed at the same distance from the axis. As shown in FIGS. 14 and 15, at both ends of each recess 33a and each protrusion 34a in the circumferential direction, tapered surfaces inclined in the circumferential direction are provided. The protrusions 34a are fitted in the recesses 33a with their tapered surfaces in contact. In a cap portion 33b integral with the first gear 33, a coil spring 6 supported by a spring supporting portion 34b integral with the second gear 34 is incorporated in a compressed state. By the elastic force of the coil spring 6, the first gear 33 is always urged toward the second gear 34. Thus, the drive force of the motor 2 can be reliably transmitted from the first gear 33 through the second gear 34 to the threaded rod 4.

On the cap portion 33b of the first gear 33, a pressing protrusion 33c is formed. A force sensor 7 that can be pressed by the pressing protrusion 33c is attached to a supporting wall portion 1c of the case 1. As described later, when an external force is applied to the display main body 10 and the first gear 33 is displaced against the elastic force of the coil spring 6 in the axial direction, the pressing protrusion 33c presses the force sensor 7 according to the amount of displacement, and thus the size of the external force can be detected by the force sensor 7. The force sensor 7 is a known piezoresistance-based device. When a force from a measuring object is applied to a sensing portion that is a silicon implantation piezoresistor or the like, the resistance of the sensing portion increases in proportion to the size of the force applied to it. The detection signal output from the force sensor 7 is mainly used for control of the motor 2, and is also used as a control signal for a warning screen displayed on the display main body 10, a warning tone emitted from a speaker portion (not shown), or the like.

Figure 3:
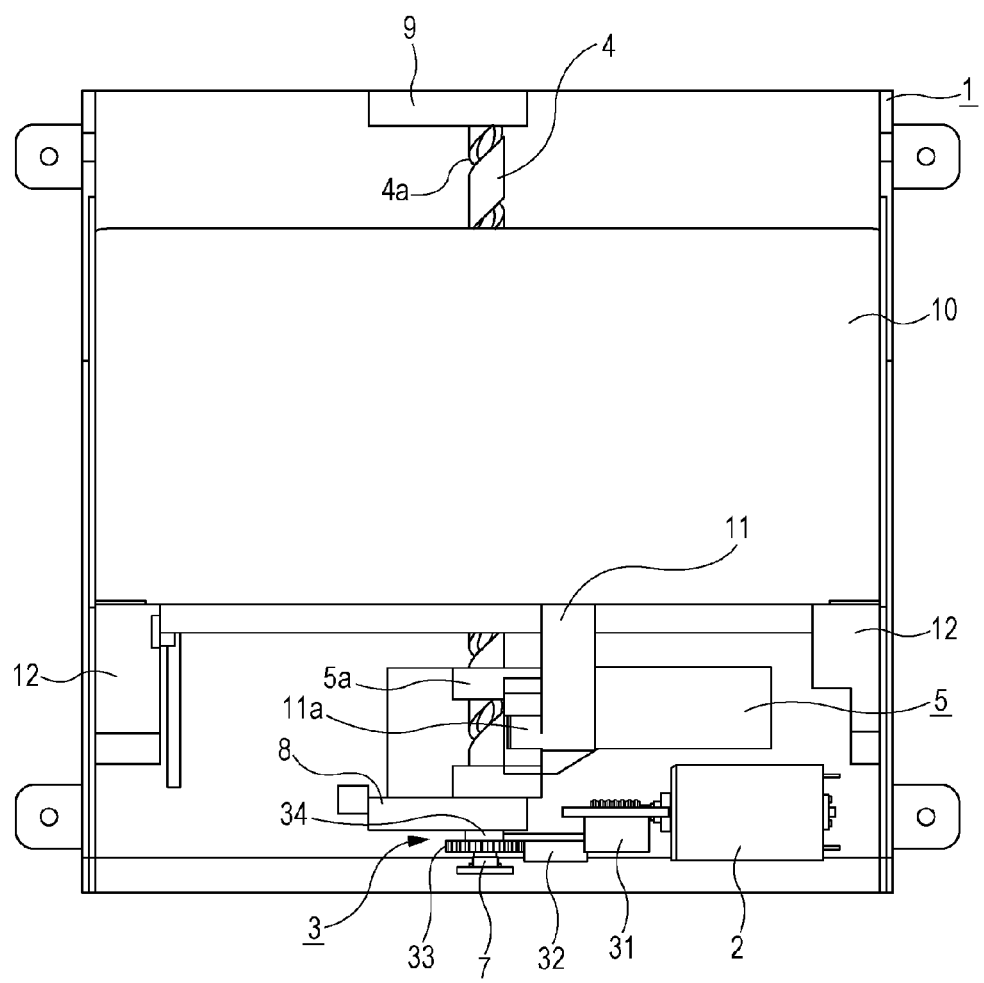
FIG. 3 is a top view corresponding to FIG. 1.
Figure 4:
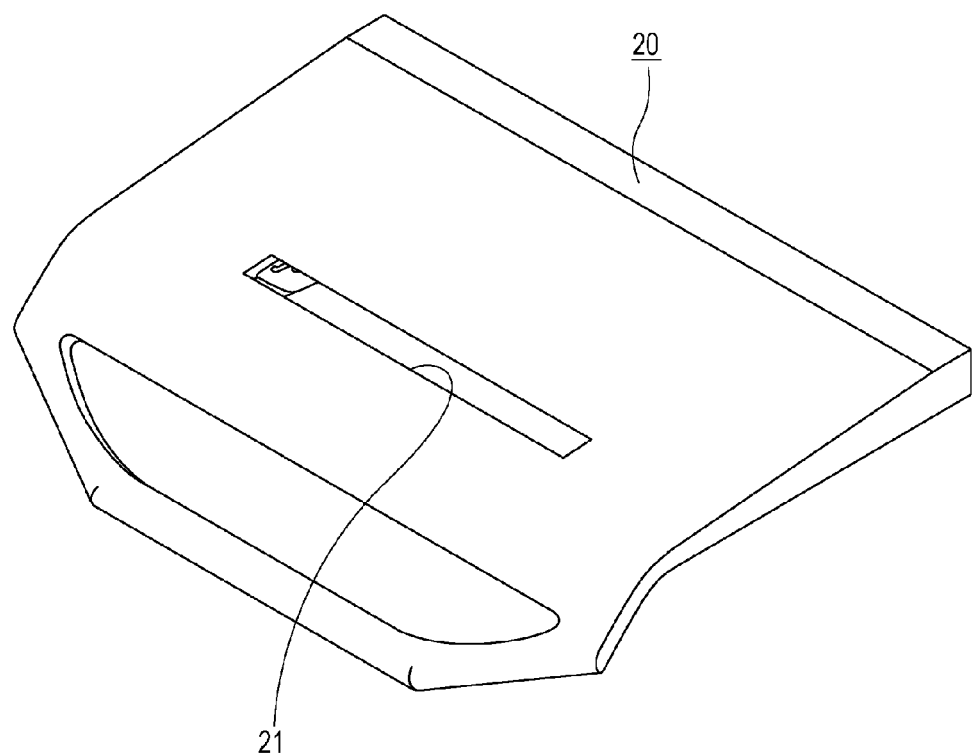
FIG. 4 is a perspective view of a cover member to be attached to the on-vehicle display apparatus.

As shown in FIG. 3, the rear end and the front end of the threaded rod 4 are rotatably supported by a bearing member 8 and a bearing member 9, respectively. The threaded rod 4 is provided with a helically extending thread groove 4a, and its lead angle is set sufficiently greater than its friction angle. A female thread portion 5a of the slider 5 is screwed to the thread groove 4a of the threaded rod 4. As the threaded rod 4 rotates, the slider 5 moves back and forth along the bottom plate portion of the case 1. That is to say, rotating the threaded rod 4 in the forward direction by driving the motor 2 in the forward direction moves the slider 5 straight forward, and rotating the threaded rod 4 in the reverse direction by driving the motor 2 in the reverse direction moves the slider 5 straight backward.

Figure 7:
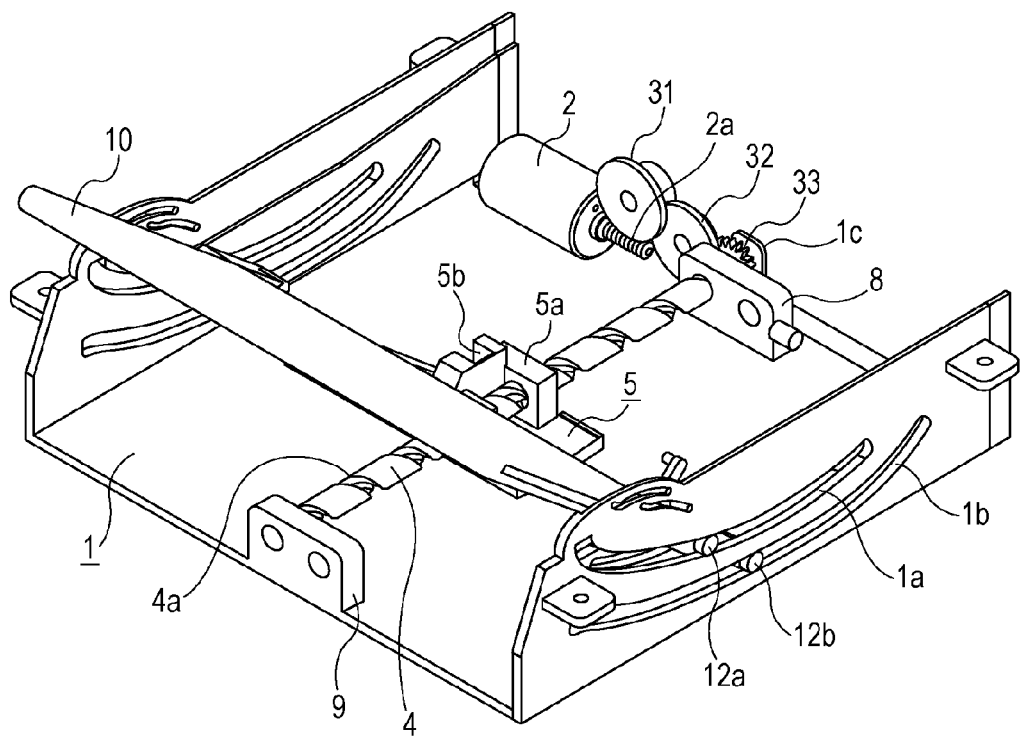
FIG. 7 is a perspective view of the on-vehicle display apparatus of FIG. 6 from another angle.
Figure 8:
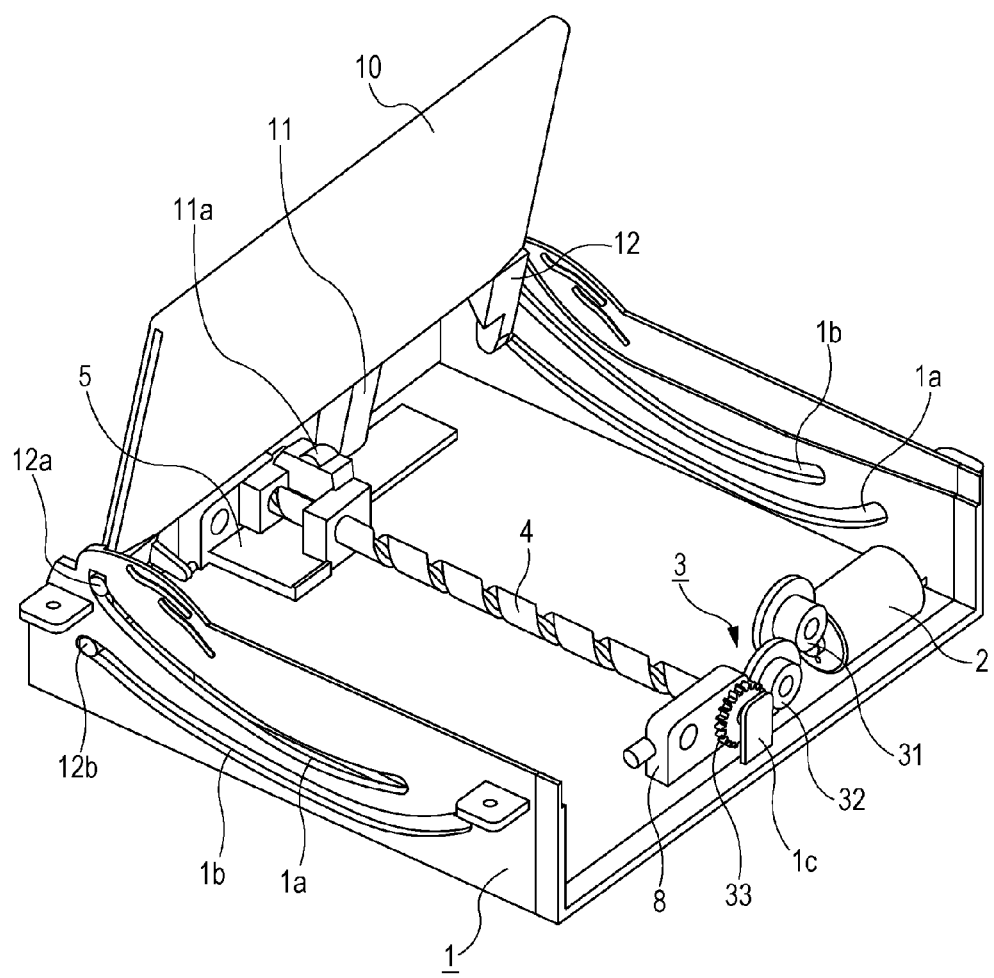
FIG. 8 is a perspective view of the on-vehicle display apparatus in a state where the display main body has been raised.
Figure 9:
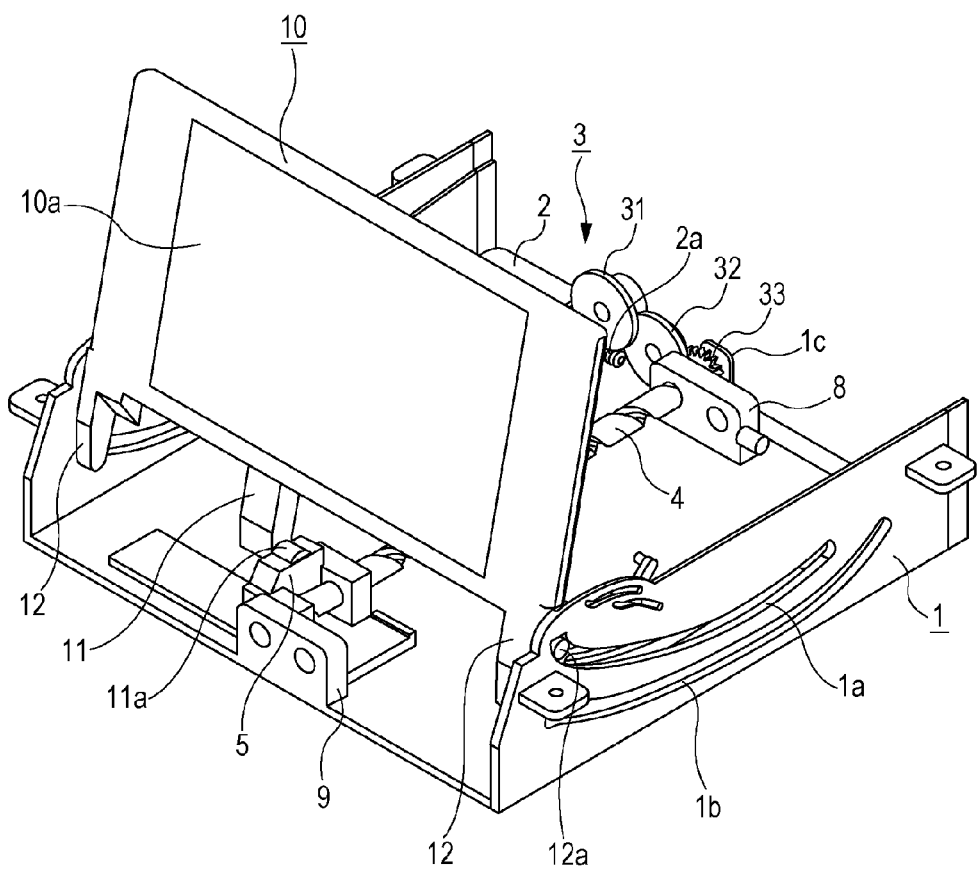
FIG. 9 is a perspective view of the on-vehicle display apparatus of FIG. 8 from another angle.
Figure 10:
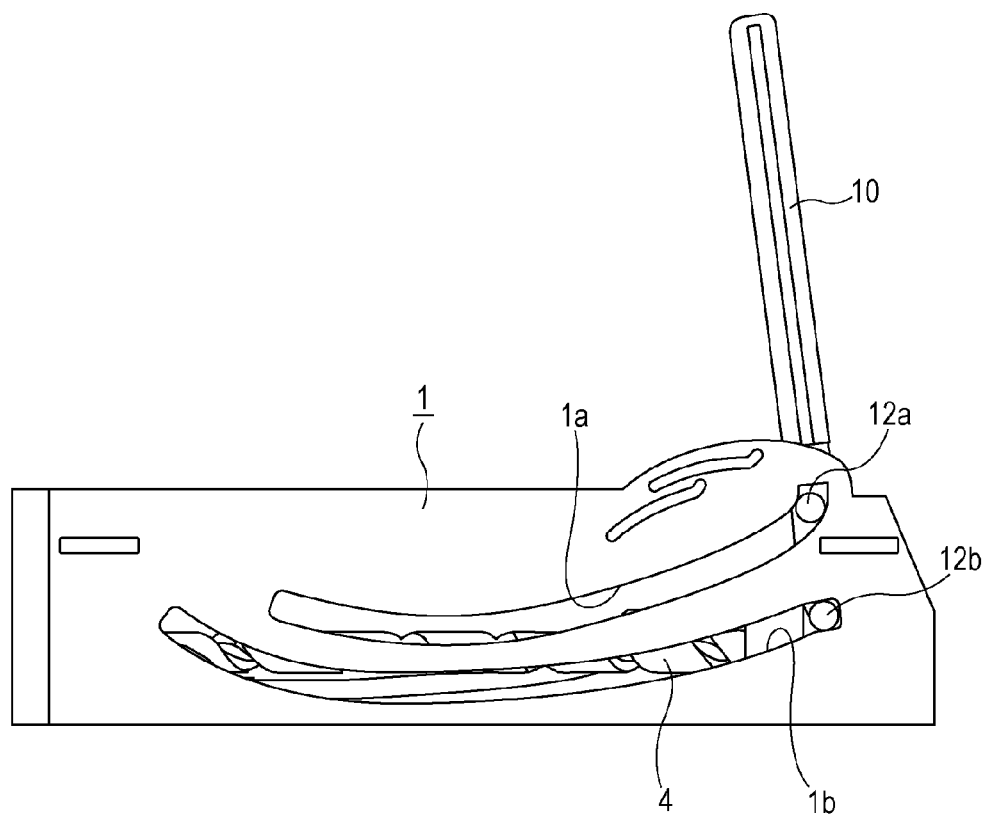
FIG. 10 is a side view corresponding to FIG. 8.
Figure 11:
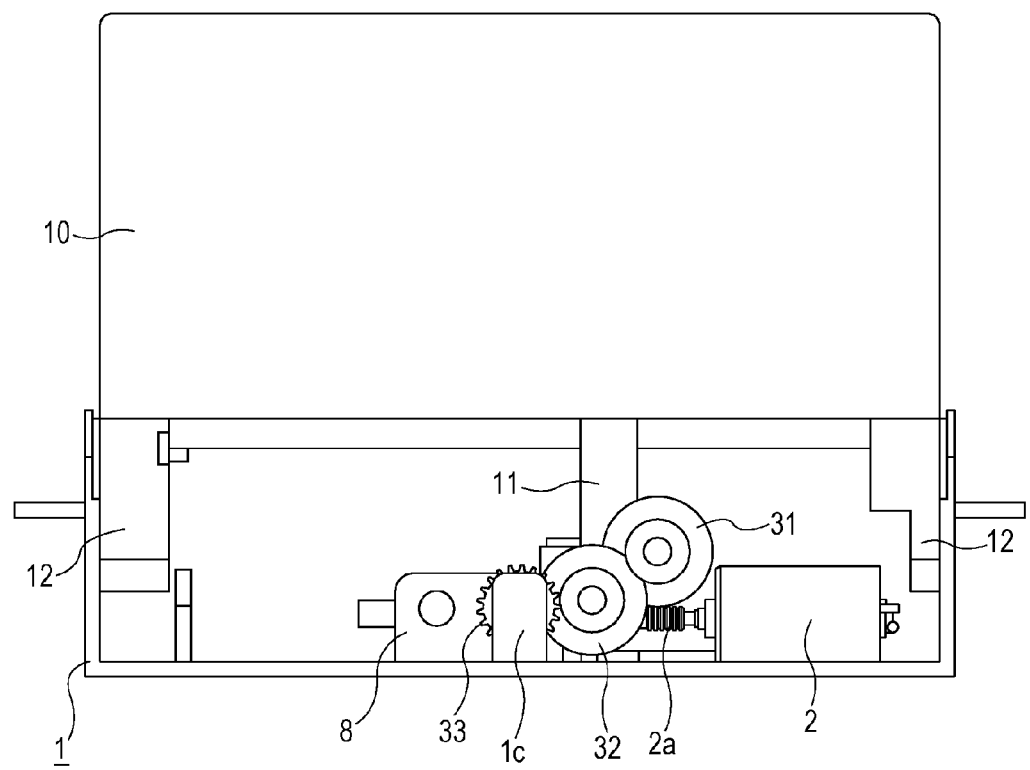
FIG. 11 is a rear view corresponding to FIG. 8.
Figure 12:
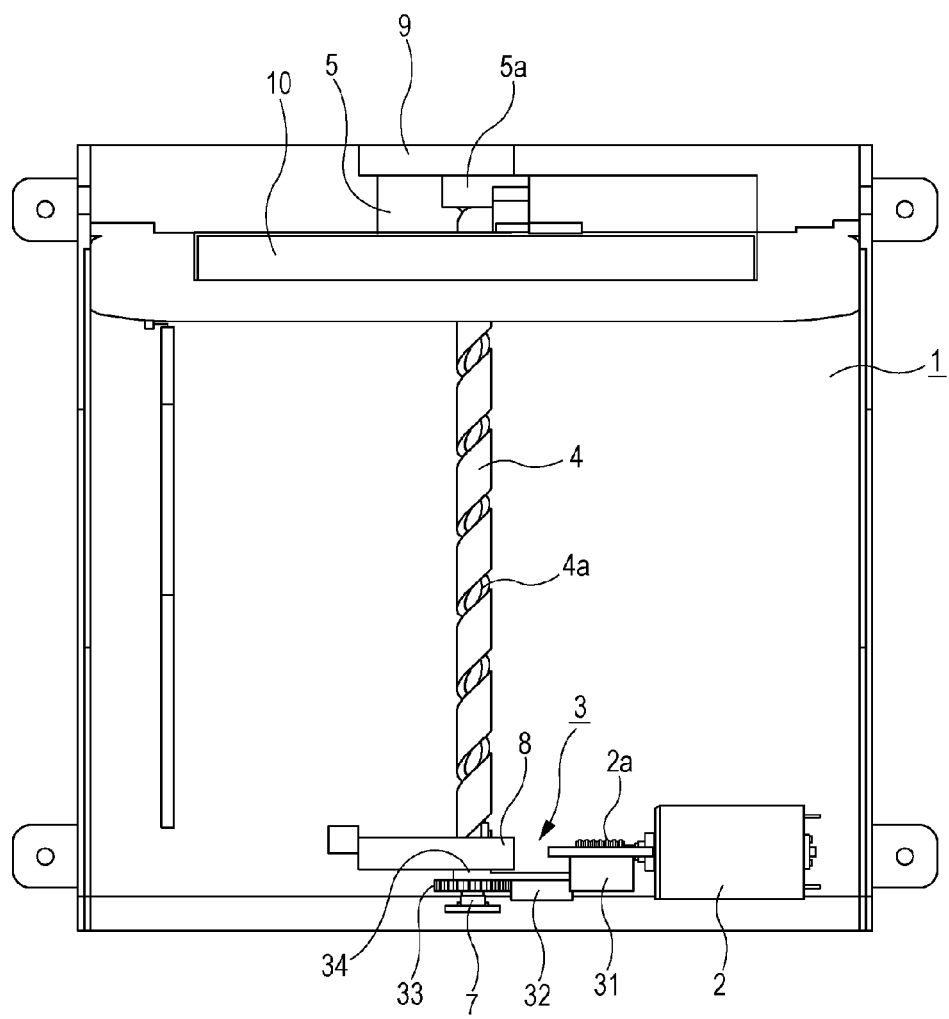
FIG. 12 is a top view corresponding to FIG. 8.

As shown in FIG. 7 and FIG. 8, the slider 5 is provided with an engagement groove 5b extending in the vertical direction, and a connecting pin 11a provided at the distal end of a drive lever 11 is inserted in the engagement groove 5b rotatably and slidably. The proximal end of the drive lever 11 is integrally fixed to the display main body 10, and thus the display main body 10 is rotatably connected to the slider 5 by the drive lever 11. As the drive force of the motor 2 rotates the threaded rod 4 and moves the slider 5 back and forth, the connecting pin 11a of the drive lever 11 moves back and forth, and the drive force of the motor 2 is transmitted to the display main body 10. However, since the lead angle of the threaded rod 4 is set greater than the friction angle thereof, the threaded rod 4 can also be rotated by an external force applied to the slider 5 through the display main body 10.

Figure 6:
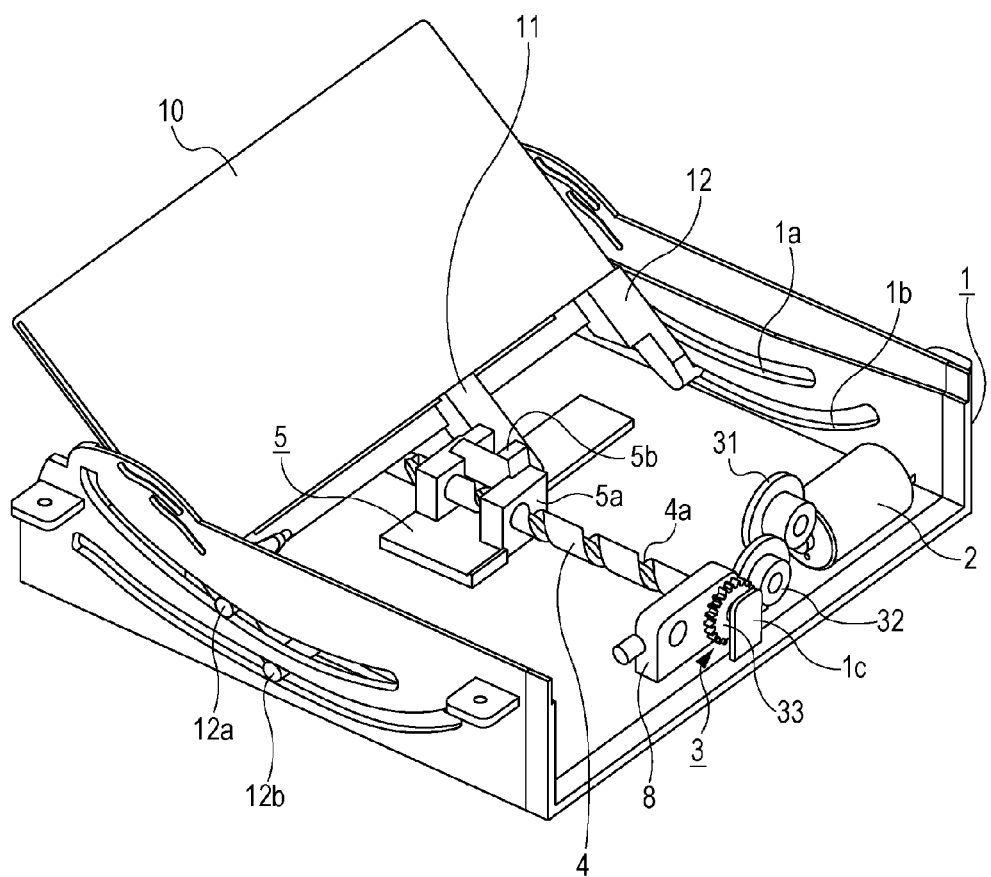
FIG. 6 is a perspective view of the on-vehicle display apparatus in a state where the display main body is being raised.

Each of the left and right side plates of the case 1 is provided with an upper cam groove 1a and a lower cam groove 1b extending in the front-back direction while curving gently. As is clear from FIG. 10, the front end of the upper cam groove 1a is steep compared to the front end of the lower cam groove 1b, and the rear end of the lower cam groove 1b extends to a position nearly just behind the rear end of the upper cam groove 1a. As shown in FIGS. 6 and 7, a pair of guide levers 12 integrally fixed to both left and right sides of the display main body 10 are provided with engagement pins 12a and 12b, and the engagement pins 12a and 12b of the guide levers 12 are slidably inserted into the cam grooves 1a and 1b, respectively. As the guide levers 12 move back and forth, the engagement pins 12a and 12b move along the cam grooves 1a and 1b. During this movement, the relative positions of the engagement pins 12a and 12b change according to the groove shapes of the cam grooves 1a and 1b. The guide levers 12 are in the horizontal position at the rear ends of the cam grooves 1a and 1b, and are in the vertical position at the front ends of the cam grooves 1a and 1b.

Figure 2:
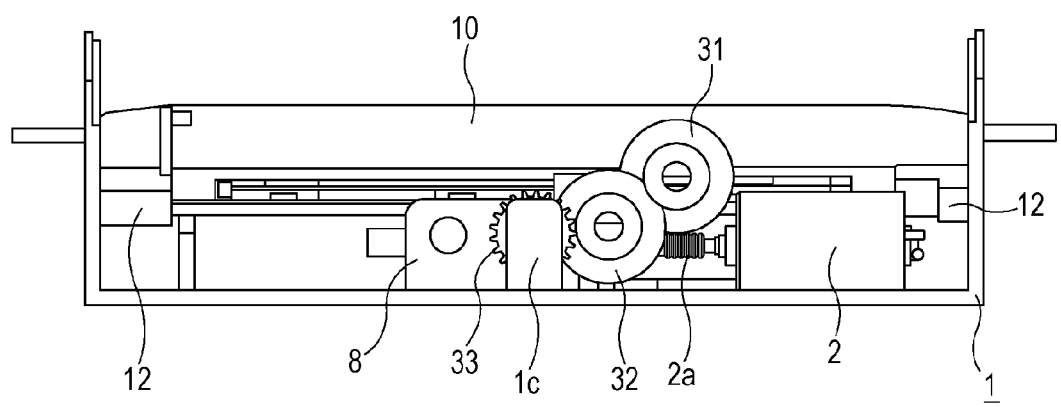
FIG. 2 is a rear view corresponding to FIG. 1.

The display main body 10 can be retracted in the horizontal position in the case 1 as shown in FIG. 1 to FIG. 3, and can be raised in the front part of the case 1 as shown in FIG. 8 to FIG. 12. The drive lever 11 is fixed to substantially the middle of the rear end of the display main body 10 in the retracted state (the lower end in the raised state), and the guide levers 12 are fixed to both left and right sides thereof. As described above, the display main body 10 is rotatably connected to the slider 5 by the drive lever 11. Thus, the slider 5 moving back and forth with the rotation of the threaded rod 4 moves the display main body 10 back and forth via the drive lever 11. When the display main body 10 moves back and forth, the guide levers 12 on both left and right sides thereof change their positions with the movement of the engagement pins 12a and 12b along the cam grooves 1a and 1b, and thus the position of the display main body 10 also changes in the same manner. That is to say, when the guide levers 12 are at the retracted positions, at the rear end of the case 1, the engagement pins 12b are pushed up by the lower cam grooves 1b to positions nearly just behind the engagement pins 12a, and the guide levers 12 are in the horizontal position, and thus the display main body 10 is also in the horizontal position (see FIG. 1). As the guide levers 12 move forward from the retracted positions, the engagement pins 12b are guided by the lower cam grooves 1b obliquely downward, and then the engagement pins 12a are guided by the upper cam grooves 1a obliquely upward, and thus the guide levers 12 gradually rise, and thus the display main body 10 also rises (see FIGS. 6 and 8).

The above-described circuit board is located between the pair of guide levers 12 and extends in the left-right direction so as to face the bottom plate portion of the case 1. This circuit board is rotatably connected to the rear end of the display main body 10 in the retracted state, and moves back and forth nearly horizontally as the slider 5 moves back and forth.

Next, the operation of the on-vehicle display apparatus configured as above will be described. As shown in FIG. 1 to FIG. 3, when the display main body 10 is retracted in the horizontal position in the case 1, the display screen 10a (see FIG. 9) of the display main body 10 faces the bottom plate portion of the case 1, and the drive lever 11 and the pair of guide levers 12 are also in the horizontal position. When the display main body 10 is in the retracted state, the slider 5 is located at the rear end of the threaded rod 4, and the engagement pins 12a and 12b of the guide levers 12 are located at the rear ends of the cam grooves 1a and 1b, respectively.

When in this state, the motor 2 is driven in the forward direction, the drive force of the motor 2 is transmitted through the gear train 3 to the threaded rod 4, and thus the threaded rod 4 rotates in the forward direction and the slider 5 moves forward. As described above, the first and second gears 33 and 34 included in the gear train 3 face each other with the protrusions 34a fitted deeply in the recesses 33a. When the first gear 33 rotates, the second gear 34 rotates coaxially and integrally with the first gear 33 (see FIG. 5A-B). Thus, the drive force of the motor 2 is reliably transmitted from the worm 2a through the gears 31 to 34 to the threaded rod 4, and the slider 5 moves forward with the forward rotation of the threaded rod 4.

When the slider 5 moves forward, its movement is transmitted through the drive lever 11 to the display main body 10, and thus the engagement pins 12a and 12b of the guide levers 12 move forward along the cam grooves 1a and 1b, respectively. Thereby, the guide levers 12 are gradually brought into the vertical position, and thus, as shown in FIGS. 6 and 7, the display main body 10 gradually rises from the horizontal position as it moves forward.

Further forward rotation of the threaded rod 4 from the state of FIGS. 6 and 7 moves the engagement pins 12a and 12b of the guide levers 12 forward and obliquely upward along the cam grooves 1a and 1b, and thus the connecting pin 11a of the drive lever 11 moves upward in the engagement groove 5b of the slider 5. In this process, the engagement pins 12a are pushed up more significantly than the engagement pins 12b, and thus the guide levers 12 and the display main body 10 increase their angles. When the slider 5 reaches the front end of the threaded rod 4, as shown in FIG. 8 to FIG. 12, the engagement pins 12a and 12b are located at the front ends of the cam grooves 1a and 1b, respectively, and the angles of the guide levers 12 are greatest, and thus the display main body 10 can be raised into the desired vertical position.

Figure 13:
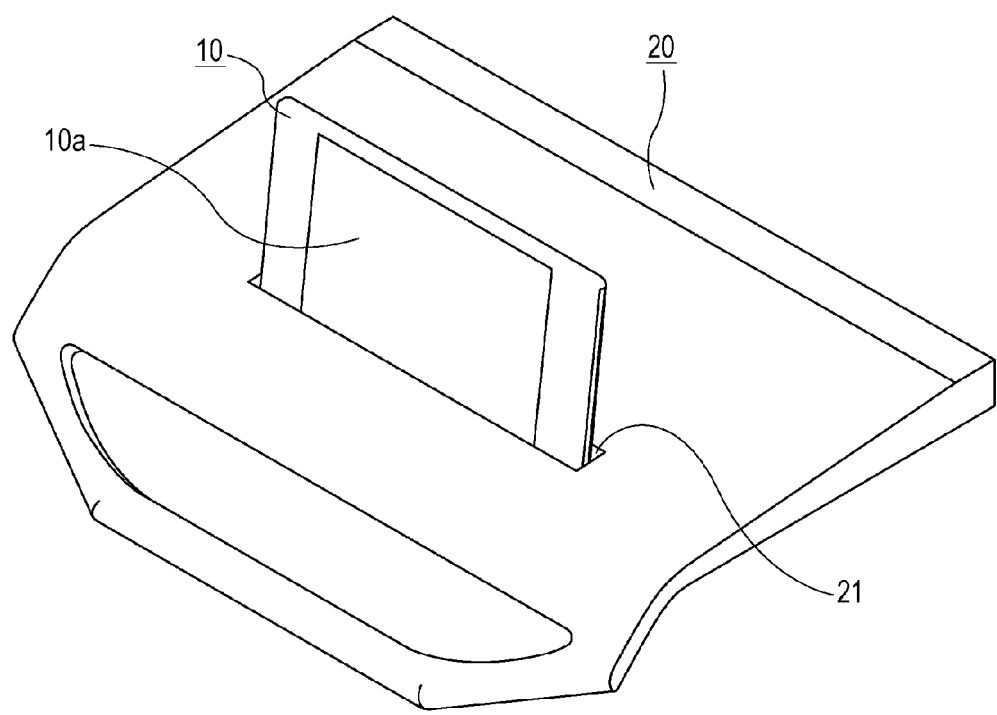
FIG. 13 is a perspective view showing the cover member of FIG. 4 through which the display main body has been raised.

The cover member 20 covering this on-vehicle display apparatus is provided with a slot-like elongate hole 21 (see FIG. 4), and the display main body 10 rises through the elongate hole 21 (see FIG. 13).

This on-vehicle display apparatus can avoid damage in the case where, when the display main body 10 has been raised or is being raised, an external force that tries to forcibly retract the display main body 10, or an external force that interferes with the raising of the display main body 10, and also in the case where, when the display main body 10 is being retracted, an external force that tries to forcibly raise the display main body 10, or an external force that interferes with the retraction of the display main body 10. That is to say, when the display main body 10 has been raised or when the display main body 10 is being raised or retracted, sometimes an external force that tries to forcibly retract the display main body or an external force that interferes with the raising or retraction of the display main body 10 is applied, owing to collision with the user's body, mischief of a child, or the like. So, in this embodiment, as shown in FIG. 5, the protrusions 34a of the second gear 34 are fitted in the recesses 33a of the first gear 33 so that the gears 33 and 34 can rotate integrally, and the first gear 33 is elastically urged toward the second gear 34 by the coil spring 6. Thus, when a force interferes with the rotation of the first gear 33 on the input side, or rotates the first gear 33 on the input side in the reverse direction acting from the second gear 34 on the output side on the first gear 33 on the input side, the tapered surfaces provided at both ends of each recess 33a and each protrusion 34a in the circumferential direction slide on each other, the protrusions 34a gradually come out of the recesses 33a while compressing the coil spring 6, the first gear 33 is displaced in the axial direction, and according to the amount of displacement thereof, the pressing protrusion 33c presses the force sensor 7. Thus, in order to eliminate the effect of the unwanted external force applied to the display main body 10, the motor 2 can be appropriately controlled on the basis of the detection result of the force sensor 7.

For example, if a pushing force tries to forcibly retract the display main body 10 from the user side when the display main body 10 has been raised, the slider 5 rotates the threaded rod 4 in the reverse direction. As a result, the second gear 34 rotates relative to the first gear 33 that is not rotating, and thus the protrusions 34a of the second gear 34 gradually come out of the recesses 33a of the first gear 33, and the first gear 33 is displaced against the coil spring 6 away from the second gear 34. The displacement of the first gear 33 causes the pressing protrusion 33c of the cap portion 33b to press the force sensor 7, and a pushing force in proportion to the amount of pressing (the amount of displacement of the first gear 33) is output as the change in resistance of the force sensor 7. Thus, by appropriately controlling the motor 2 according to the detection result of the force sensor 7 (when a change in resistance larger than a predetermined amount is detected), the operation required to move the display main body 10 away from the pushing force (temporary retracting operation) can be performed quickly. If a warning screen is displayed on the display main body 10 and/or a warning tone is emitted from a speaker portion (not shown) when the change in resistance of the force sensor 7 before the control of the motor 2 is smaller than the predetermined amount, that is to say, in the early stage in which the pushing force is not very large, the user can be warned beforehand to stop pushing. If, after such a warning, the motor 2 is controlled and the retraction of the display main body 10 is started, the user can easily know why the display main body 10 starts to be retracted.

Similarly, when a resisting force interferes with the raising or retraction of the display main body 10, this resisting force prevents the threaded rod 4 and the second gear 34 from rotating, and thus, as the first gear 33 is rotated by the drive force of the motor 2, the protrusions 34a gradually come out of the recesses 33a, and the first gear 33 is displaced against the coil spring 6 away from the second gear 34. Thus, on the basis of the amount of pressing of the force sensor 7 by the pressing protrusion 33c (the amount of displacement of the first gear 33), the size of the resisting force is output as the change in resistance of the force sensor 7. By appropriately controlling the motor 2 according to the detection result of the force sensor 7 (when a change in resistance larger than a predetermined amount is detected), the operation required to move the display main body 10 away from the resisting force (temporary retracting operation or temporary raising operation) can be performed quickly. Also in this case, if a warning screen is displayed on the display main body 10 and/or a warning tone is emitted from a speaker portion (not shown) in the early stage in which the change in resistance of the force sensor 7 is smaller than the predetermined amount, the user can be warned beforehand to stop interfering with the raising of the display main body 10, and the user can easily learn that the raising of the display main body 10 is being interfered with.

Although in this embodiment, protrusions 34a provided on the second gear 34 on the output side are fitted in the recesses 33a provided in the first gear 33 on the input side, protrusions of the first gear 33 may be fitted in recesses of the second gear 34. The amount of fitting of the protrusions in the recesses (the height of fitting) is set to such an amount that the first gear 33 and the second gear 34 remain in engagement even when the first gear 33 is maximally moved relative to the second gear 34. Thus, the first gear 33 does not rotate idly relative to the second gear 34, and the protrusions can be prevented from moving into and out of the recesses and thereby generating an abnormal noise.

When retracting the display main body 10 in the raised state shown in FIG. 8 to FIG. 12, the slider 5 is moved backward by driving the motor 2 in the reverse direction and thereby rotating the threaded rod 4 in the reverse direction. That is to say, when the slider 5 moves backward, the engagement pins 12a and 12b of the guide levers 12 move backward along the cam grooves 1a and 1b, respectively, and thus the guide levers 12 are gradually brought into the horizontal position. Thus, the display main body 10 moves backward while being inclined. When the slider 5 reaches the rear end of the threaded rod 4, the display main body 10 is retracted in the horizontal position in the case 1 as shown in FIG. 1 to FIG. 3.

As described above, in the on-vehicle display apparatus according to this embodiment, the facing surfaces of a first gear 33 on the input side and a second gear 34 on the output side are in a recess-protrusion engagement, the first gear 33 is elastically urged toward the second gear 34 by a spring member 6, the first and second gears 33 and 34 can be rotated coaxially and integrally, and thus the drive force of a motor 2 can be reliably transmitted from the first gear 33 through the second gear 34 to a threaded rod 4. A display main body 10 is rotatably connected to a slider 5 that moves back and forth with the rotation of the threaded rod 4, and thus the display main body 10 can be moved smoothly, while being guided by cam grooves 1a and 1b, between a horizontal retracted position and a vertical raised position.

If an unwanted external force such as a pushing force tries to forcibly retract the display main body 10 in the raised state, or a resisting force interferes with the raising or retraction of the display main body 10, protrusions 34a of the second gear 34 gradually come out of recesses 33a of the first gear 33, and the first gear 33 is displaced against the coil spring 6 away from the second gear 34. Thus, on the basis of the amount of pressing of a force sensor 7 by a pressing protrusion 33c (the amount of displacement of the first gear 33), the size of the unwanted external force can be detected by the force sensor 7. By appropriately controlling the motor 2 according to the detection result of the force sensor 7, the operation required to move the display main body 10 away from this type of external force can be performed quickly. Thus, this on-vehicle display apparatus can prevent damage to its power transmission mechanisms without the need to add a large clutch mechanism, and can also prevent generation of an abnormal noise caused by intermittent disconnection of the power transmission pathway in the case where a clutch mechanism is used.

Thus, this on-vehicle display apparatus can minimize thickness, and if an unwanted external force is applied to the display main body 10, there is no possibility that this on-vehicle display apparatus is damaged, or generates an abnormal noise.

Next, with reference to FIG. 14 to FIG. 19, a second embodiment of the present invention will be described. In FIG. 14 to FIG. 19, the same reference numerals will be used to designate the same components as those in the above-described first embodiment, and the redundant description thereof will be omitted.

Figure 18:
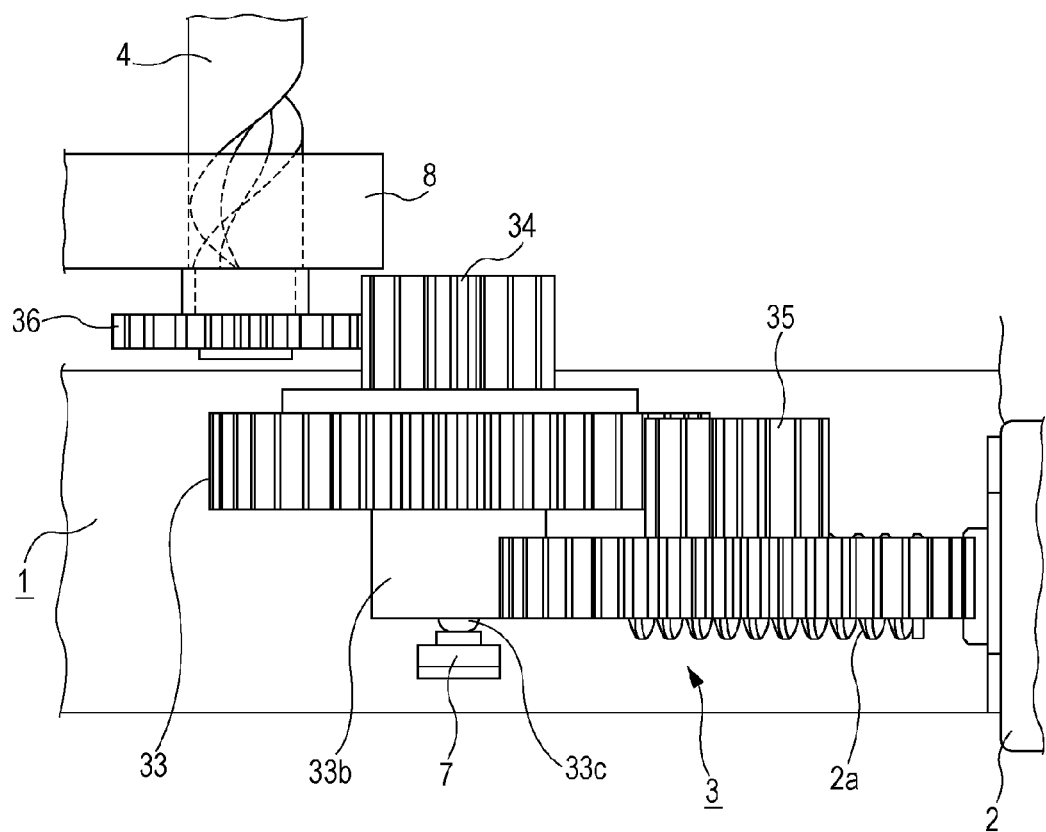
FIG. 18 is a main part top view showing a normal state where a force sensor does not detect an external force in the second embodiment.
Figure 19:
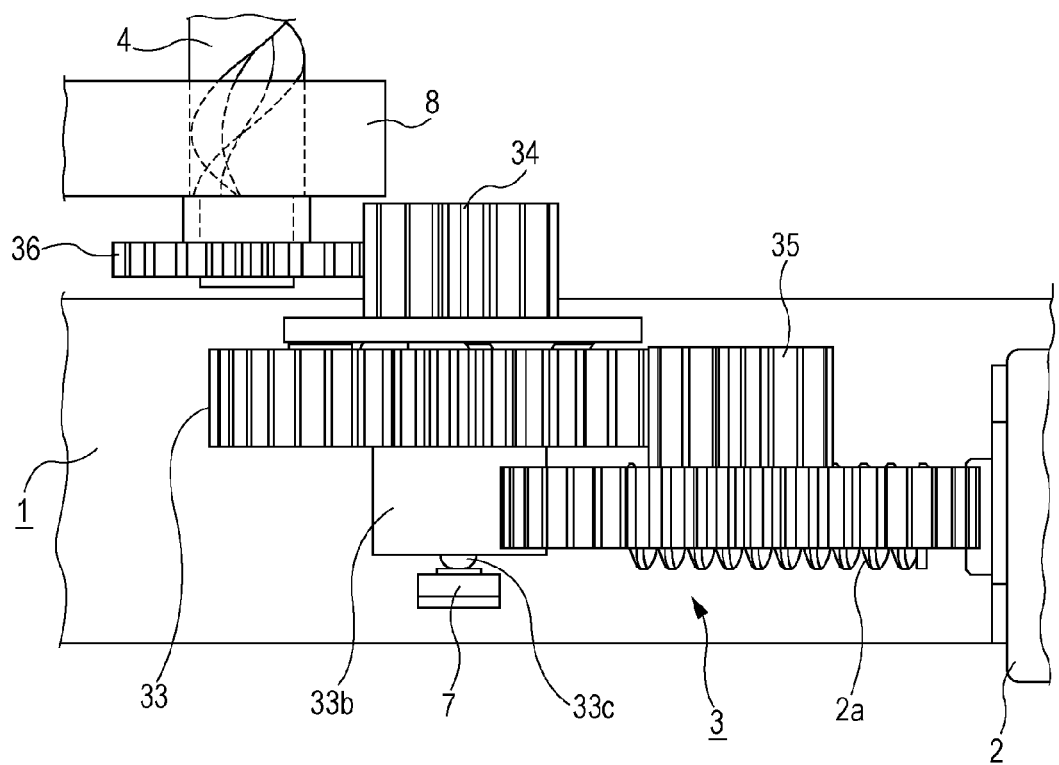
FIG. 19 is a main part top view showing an abnormal state where the force sensor detects an external force in the second embodiment.

This second embodiment differs from the first embodiment in that a gear train 3 is configured by disposing first and second gears 33 and 34 that are in a recess-protrusion engagement and can rotate coaxially and integrally, between a gear 35 in meshing engagement with a worm 2a and a third gear 36 fixed to the rear end of a threaded rod 4. That is to say, in the second embodiment, the drive force of a motor 2 is transmitted from a worm 2a to a gear 35, the gear 35 is in meshing engagement with a first gear 33, and as shown in FIGS. 18 and 19, a second gear 34 that is in a recess-protrusion engagement and rotates coaxially with the first gear 33 is in meshing engagement with a third gear 36 that rotates coaxially with the threaded rod 4. However, also in the second embodiment, as in the first embodiment, a coil spring 6 incorporated in a cap portion 33b elastically urges the first gear 33 on the input side toward the second gear 34 on the output side, and when the first gear 33 is displaced in the axial direction, a pressing protrusion 33c of the cap portion 33b presses a force sensor 7 (see FIG. 17A-C).

The axis of the gears 33 and 34 that are in a recess-protrusion engagement so that the force sensor 7 can detect an unwanted external force applied to a display main body 10, is offset with respect to the axis of the threaded rod 4. When the first gear 33 is displaced against the urging force of the coil spring 6 in the axial direction, there is no possibility that the reaction force displaces the threaded rod 4 in the axial direction. Thus, the reliability is improved.

While there has been illustrated an described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teaching of the invention without departing from the central scope thereof. Therefore, it is intended that this invention not be limited to the particular embodiments disclosed, but that the invention will include all embodiments falling within the scope of the appended claims.

What is claimed is:

1. An on-vehicle display apparatus comprising:
   a motor;
   a threaded rod provided with a helically extending thread groove;
   a gear train transmitting the drive force of the motor to the threaded rod;
   a slider screwed to the thread groove and moving back and forth with the rotation of the threaded rod;
   a case in which the motor, the threaded rod, the gear train, and the slider are disposed; and
   a display main body rotatably connected to the slider and capable of being moved by the drive force of the motor between a state where the display main body is retracted in the case and a state where the display main body is raised in the front part of the case,
   wherein the lead angle of the threaded rod is set greater than the friction angle thereof so that the threaded rod is rotated by an external force applied to the slider through the display main body, the gear train includes a first gear on the relatively input side and a second gear on the relatively output side, the first and second gears face each other, protrusions provided on one of the first and second gears are fitted in recesses provided in the other so that the gears rotate coaxially and integrally, the on-vehicle display apparatus further comprises a spring member elastically urging the first gear toward the second gear, and a detection sensor detecting the size of the external force on the basis of the displacement of the first gear against the spring member in the axial direction, and the motor is controlled on the basis of the detection result of the detection sensor such that the display main body is moved away from the external force.

2. The on-vehicle display apparatus according to claim 1, further comprising a third gear rotating coaxially and integrally with the threaded rod, wherein the second gear is in meshing engagement with the third gear.

3. The on-vehicle display apparatus according to claim 2, wherein the detection sensor is a force sensor that outputs a detection signal in proportion to the size of the external force.

4. The on-vehicle display apparatus according to claim 3, wherein a detected resistance of the force sensor changes in proportion to the size of the external force, and when the change in the detected resistance of the force sensor is smaller than a predetermined amount, a warning screen is displayed on the display main body.

5. The on-vehicle display apparatus according to claim 4, wherein when the change in the detected resistance of the force sensor exceeds the predetermined amount, the motor is controlled such that the display main body is moved away from the external force.

6. The on-vehicle display apparatus according to claim 1, wherein the amount of fitting of the protrusions in the recesses is set to such an amount that the first gear and the second gear remain in engagement even when the first gear is maximally moved relative to the second gear.

7. An on-vehicle display apparatus comprising:
   a motor;

a threaded rod provided with a helically extending thread groove;

a gear train transmitting the drive force of the motor to the threaded rod;

a slider screwed to the thread groove and moving back and forth with the rotation of the threaded rod;

a case in which the motor, the threaded rod, the gear train, and the slider are disposed; and a display main body rotatably connected to the slider and capable of being moved by the drive force of the motor between a state where the display main body is retracted in the case and a state where the display main body is raised in the front part of the case, wherein the lead angle of the threaded rod is set greater than the friction angle thereof so that the threaded rod is rotated by an external force applied to the slider through the display main body, the gear train includes a first gear on the relatively input side and a second gear on the relatively output side, the first and second gears face each other, protrusions provided on one of the first and second gears are fitted in recesses provided in the other so that the gears rotate coaxially and integrally, the on-vehicle display apparatus further comprises a spring member elastically urging the first gear toward the second gear, and a force sensor that detects the size of the external force on the basis of the displacement of the first gear against the spring member in the axial direction and outputs a detection signal in proportion to the size of the external force, and the motor is controlled on the basis of the detection result of the force sensor such that the display main body is moved away from the external force.

8. The on-vehicle display apparatus according to claim 7, further comprising a third gear rotating coaxially and integrally with the threaded rod, wherein the second gear is in meshing engagement with the third gear.

9. The on-vehicle display apparatus according to claim 7, wherein a detected resistance of the force sensor changes in proportion to the size of the external force, and when the change in the detected resistance of the force sensor is smaller than a predetermined amount, a warning screen is displayed on the display main body.

10. The on-vehicle display apparatus according to claim 9, wherein when the change in the detected resistance of the force sensor exceeds the predetermined amount, the motor is controlled such that the display main body is moved away from the external force.

11. The on-vehicle display apparatus according to claim 7, wherein the amount of fitting of the protrusions in the recesses is set to such an amount that the first gear and the second gear remain in engagement even when the first gear is maximally moved relative to the second gear.

* * * * *